A. G. F. KUROWSKI.
TYPEWRITING MACHINE.
APPLICATION FILED JAN. 17, 1919.

1,351,428.

Patented Aug. 31, 1920.
2 SHEETS—SHEET 1.

Inventor:
Alfred G. F. Kurowski
by B. C. Stickney
Attorney.

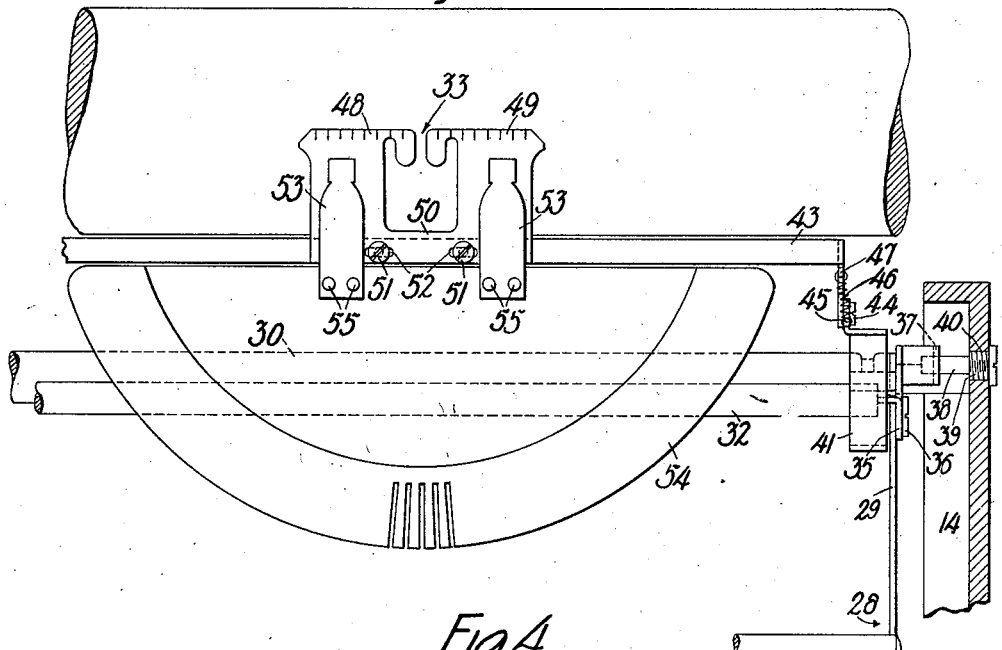
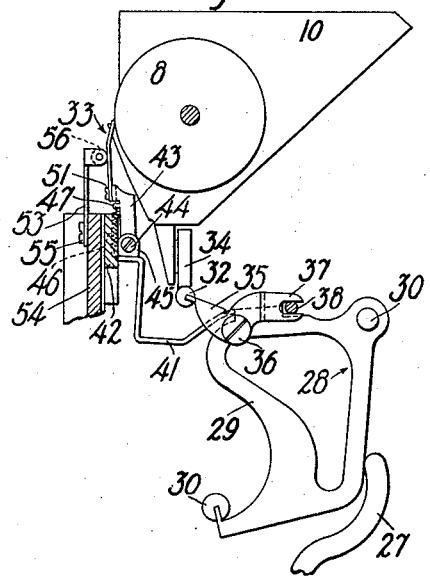

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING-MACHINE.

1,351,428.      Specification of Letters Patent.      Patented Aug. 31, 1920.

Application filed January 17, 1919. Serial No. 271,568.

*To all whom it may concern:*

Be it known that I, ALFRED G. F. KUROWSKI, a subject of the Emperor of Germany or a citizen of Germany, but having taken out preliminary United States naturalization papers, residing in Brooklyn borough, in the county of Kings, city and State of New York, have invented certain new and useful Improvements in Typewriting-Machines, of which the following is a specification.

This invention relates to rising scales or line-gages for typewriting machines in which the platen has a case-shift movement, and also to means for effecting such case-shift movement, and is an improvement on my prior Patent No. 1,220,647 dated March 27, 1917. It is to be noted that the rising scale also serves as a work-sheet holder.

In the above-mentioned patent, both the rising scale and the shift bar by which the platen frame is supported, are actuated by means of a pivoted shift frame, and the compensation for the differential movement, which would naturally result from the difference in the radial distances of the rising scale and shift bar from the pivot of the shift frame, is obtained by means whereby motion is lost between the rising scale and the shift frame. In the patented structure, also, the rising scale is guided for sliding vertical movement in a fixed part of the frame, and is supported against movement from the platen by means of spring clips carrying rollers engaging with the upwardly-extending wings of said scale.

In the present invention, a similar result is obtained by providing for a decreased movement of the shift frame, so as to remove any necessity for loss of motion between the shift frame and the rising scale, and, at the same time, providing for an increase or multiplication of motion between the shift frame and the lifting or supporting bar or rail for the platen frame.

A feature of the invention resides in the mounting of the rising scale on arms having swinging movement, due to being fixed on the shift frame, and the provision whereby the rising scale is maintained in suitable coöperation with the platen. With the rising scale mounted on arms having swinging movement, the tendency would be to move the scale toward and from the platen during the case-shift movement, and thus interfere with the simultaneous operation of the two parts. To obviate this condition, the rising scale is pivotally connected to its swinging support, and provision is made of spring means which urge the scale away from the platen. In order to hold the scale in proper position with reference to the platen, springs or spring clips mounted on a fixed part of the typewriting machine frame are provided, and said spring clips are so positioned that rollers thereon will engage the wings of the said rising scale and serve to maintain the scale in proper position.

Another feature resides in the provision of means whereby the shift rail, instead of moving with the shift frame, is given a differential movement with respect thereto.

Other features and advantages will hereinafter appear.

In the accompanying drawings,

Fig. 3 is a front elevation of some parts of the invention, and shows some details of the means for giving an additional movement to the shift rail.

Fig. 4 is a side view, partly in section, of the parts shown in Fig. 3, showing the parts in upper-case position.

Figure 1:
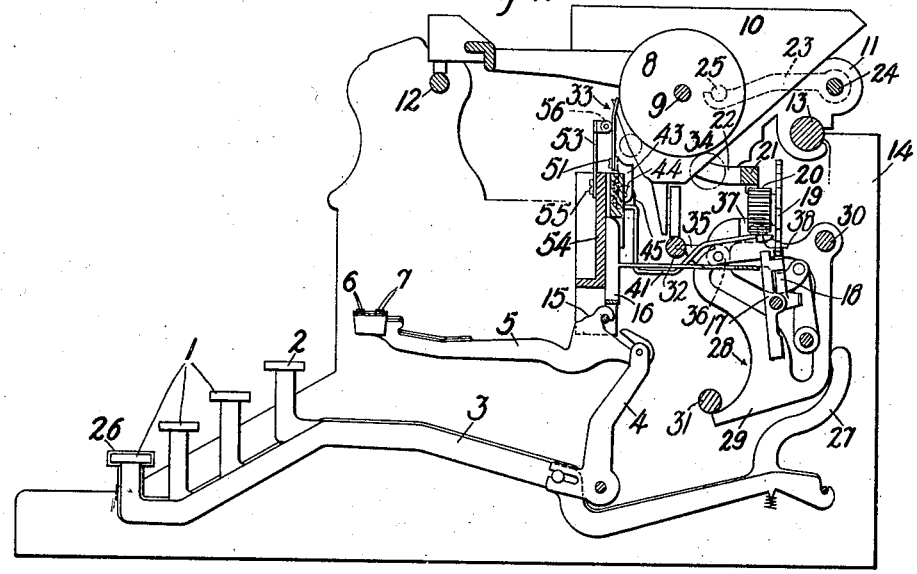
Figure 1 is a diagrammatic side elevation, partly in section, of an Underwood typewriting machine with the present invention applied thereto, the platen and the rising scale being in normal or lower-case position.

Upon depression of alphabet keys 1 or numeral keys 2, the corresponding key levers 3 will be depressed, and motion will be transmitted through bell-cranks 4, to swing type-bars 5 upwardly and rearwardly, to cause upper-case types 6 or lower-case types 7 to strike a work-sheet supported on platen 8.

Said platen 8 is revolubly supported by means of a shaft 9 in a frame or carriage 10, which is mounted for vertical movement in a typewriter carriage 11, supported for sliding movement on rods 12 and 13, supported in frame 14 of the machine. Said carriage 11 is normally urged in one direction by the usual spring drum, not shown.

Upon the approach of a type-bar to the platen 8, a heel 15 on said type-bar will engage a universal frame 16 and effect actuation of fast and loose dogs 17 and 18, respectively, to intermittently release escapement wheel 19. Connected to said escapement wheel 19 is a pinion 20, which meshes with a rack 21 supported on arms 22 pivoted on carriage 11. By this connection, the movement of said carriage, under the urging of said spring drum, is controlled.

To assist in guiding frame 10 in its vertical movement, provision is made of arms 23 secured to shaft 24 mounted for rocking movement in carriage 11. It will be seen that said arms 23 engage with pins 25 on said frame 10.

The parts thus far described may be of the usual construction found in Underwood typewriting machines.

Upon depression of shift key 26, and actuation of the corresponding lever, an arm 27, extending upwardly from said lever, will rock a shift frame, designated in general by 28, to effect case-shift action. Said shift frame 28 comprises brackets or bellcranks 29 fixed on a shaft 30, and a tie-rod 31 connecting said brackets 29 at their lower ends.

Figure 2:
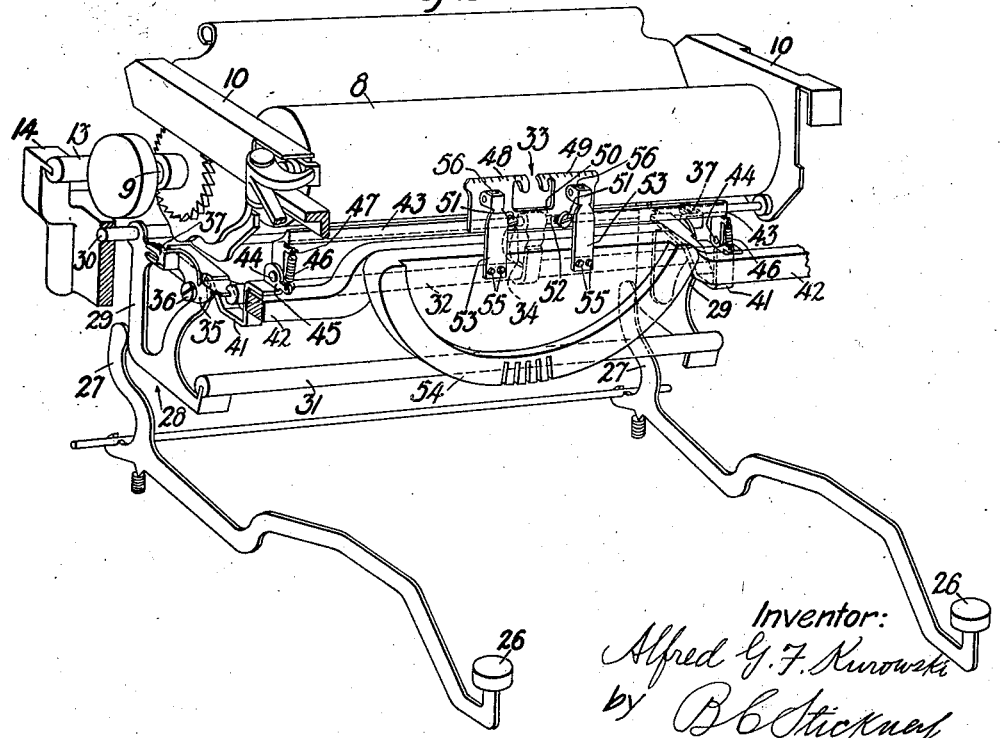
Fig. 2 is a fragmentary perspective view of so much of the machine as is necessary to show the invention.

By means of shift frame 28, actuation of shift rail 32 and rising scale 33 is attained. The clutch frame 10 is supported, as usual, by a roller 34 thereon, resting on shift rail 32. The usual guard, shown in dotted lines in Fig. 2, is provided to insure engagement between shift rails 32 and roller 34.

Usually the shift rail is fixed to the shift frame, but in the present invention, shift rail 32 is carried on the forward ends of levers 35, pivoted respectively to brackets 29 by means of screws 36, and the forked or slotted rear ends 37 of said levers engage screws 38 supported in the fixed frame 14 of the typewriting machine. To secure said screws in the frame, provision is made of enlarged threaded portions 39 which engage openings 40 in the frame Fig. 3.

In order to support the rising scale 33 on the shift frame, brackets or extensions 41 are secured to shift-frame brackets 29. Said brackets 41 are positioned with their forward ends overlying a cross bar 42 of the typewriting machine frame. A frame or bail 43 is pivotally connected by pins 44 to ears or lugs 45 supported on brackets 41, and provision is made of springs 46, which are connected at one end to lugs or ears 45, and, at the other end, to projections 47 on said frame 43, and tend to draw said frame 43 away from the platen. Said rising scale 33 is provided with wings 48 and 49, respectively, and a connecting portion 50, the rising scale being secured to frame 43 by means of screws 51 passing through slots 52 in said scale.

The tendency of springs 46 is to throw frame 43, and consequently the rising scale 33, away from the position to coöperate with the platen. In order to counteract this effect and properly position said rising scale with reference to the platen, springs or spring clips 53 are mounted on the type-bar segment 54 by means of fastening devices 55, and said springs 53 are provided with rollers 56, which engage the wings of said scale 33.

Variations may be resorted to within the scope of the invention, and portions of the improvements may be used without others.

Having thus described my invention, I claim:

1. In a typewriting machine, the combination with a platen carriage shiftable between upper and lower-case positions, and a supporting roller on said carriage, of a key-actuated shift frame, a rail on which said roller rests, rail-carrying arms pivoted on said shift frame and provided with slots, and fixed pins projecting into said slots.

2. In a case-shift device, the combination with a platen movable for case-shift action, of a platen-supporting rail, a key-actuated shift frame extending from end to end of the rail and supporting it at its ends, and means whereby movement will be given to said platen-supporting rail upon actuation of said shift frame greater than the movement of the shift frame.

3. In a typewriting machine, the combination with a platen, a platen carriage shiftable to upper and lower-case positions, a shift frame on which said carriage is supported, a shift key, a shift frame operated by said key, a line-guide carried by said frame in position to coöperate with said platen, and means whereby the motion of the shift rail will be multiplied with reference to that of the shift frame.

4. In a typewriting machine, the combination with a platen and a platen carriage shiftable between upper and lower-case positions, of a shift key, a shift frame actuated thereby, a line-guide pivotally mounted on brackets carried by said shift frame, means tending to hold said guide away from said platen, and a device for engaging said line-guide and holding the same in position to coöperate with said platen.

5. In a typewriting machine, the combination with a platen and a platen carriage shiftable to upper and lower-case positions, of a shift frame mounted on a shaft for swinging movement, a line-guide carried by said shift frame, a rail for supporting said platen carriage, said rail being carried by said shift frame and positioned nearer to said shaft than said line-guide, a shift key, means actuated by said shift key for giving said line-guide the proper amount of movement for case-shift, and means actuated by said shift frame to give a multiplied movement to said rail to obtain a movement of said platen equal to that of the line-guide.

6. In a typewriting machine, the combination with a platen carriage shiftable to upper and lower-case positions, of a rail for supporting said carriage, a shift frame, rail-carrying arms pivoted on said shift frame, and means for controlling the movements of said arms during the operation of said shift frame.

7. In a typewriting machine, the combination with a shiftable platen and controlling means therefor including a shift frame, of brackets screwed to said shift frame, of a plate pivoted to said brackets and urged away from said platen, a platen-scale secured to said plate, and means to support said scale in operative relation with respect to said platen.

8. In a typewriting machine, the combination with a revoluble platen, of a line-guide to coöperate therewith, a pivotally mounted bar on which said guide is mounted, a spring tending to turn said bar to withdraw said guide from juxtaposition with respect to said platen, a spring secured to a fixed part of the machine, and a roller on said spring for engagement with said guide to support the same in position for coöperation with the platen.

9. In a typewriting machine, the combination with a platen supported for case-shift movement, of shifting means including a case-shift frame comprising two brackets fixed to a shaft on which the frame rocks and joined by a tie-rod, a lever pivoted on each of said brackets, a rail, by means of which the platen is supported, secured to corresponding arms of the levers, forks at the other ends of said levers, and fixed pins embraced by said forks.

10. In a typewriting machine, the combination with a platen shiftable to upper and lower-case positions, of a rising scale to coöperate with said platen, a shift frame upon which said scale is pivoted, and opposing springs holding said scale up on its pivot points to insure coöperation between said platen and said scale.

11. In a typewriting machine, the combination with a platen shiftable to upper and lower-case positions, of a rising scale, a bar through which said platen-shift is effected, a shift frame mounted for swinging movement about an axis and carrying said scale and said bar, the former being farther from said axis than the latter, and means to give said bar an increased movement to compensate for the difference in radial distances from said axis.

12. In a typewriting machine, the combination with a platen and supporting means therefor including a shift rail, of a shift frame mounted for swinging movement about an axis, and means operated by said shift frame whereby an angular movement of said frame about its axis will cause a greater angular movement of said shift rail about said axis.

13. In a typewriting machine, the combination with a traveling carriage and a platen shiftable therein, of a scale shiftable with the platen, a key-operated shift-frame having ends and tie-rods, said scale pivoted in the ends of the frame, a shift-rail for the platen, levers supporting said rail and connected to the frame, so that the platen and scale shift identical amounts, and opposing springs for holding the scale up on its pivot points against the platen.

14. In a typewriting machine, the combination with a platen and supporting means therefor including a shift rail, of a swinging frame on which said rail is supported, a scale for the platen carried by the frame, keys for swinging the frame, and means for varying the position of said shift rail with respect to said frame to cause the scale and platen to shift together.

15. In a typewriting machine, the combination with a platen and supporting means therefor including a shift rail, a swinging shift frame on which said rail is supported, a rising scale, connections whereby actuation of said shift frame will effect the shifting of said scale, and means for changing the relation between said shift rail and said shift frame to maintain a substantially constant relation between the rising scale and the platen during case-shift movement.

16. In a typewriting machine, the combination with a platen and supporting means therefor including a shift rail, of a line-gage associated with said platen to indicate the writing line thereon, a swinging shift frame supporting said shift rail and said line-gage, the former being nearer to the pivot of said shift frame than the latter, key-actuated means to give said shift frame a movement sufficient to bring said line-gage to a position for upper-case printing, and means to change the relation between said rail and shift frame to cause said platen to move with said line-gage.

17. In a typewriting machine, the combination with a platen carriage shiftable to upper and lower-case positions, of a rail for supporting said carriage, a shift frame, rail-carrying levers pivoted on said shift frame, said rail connecting corresponding arms of said levers, means to effect a lifting movement of said shift frame, and means to prevent upward movement of the ends of said levers opposite to those carrying said rail.

18. In a typewriting machine, the combination with a platen shiftable between upper and lower-case positions, of shifting means for said platen including a key-actuated shift frame, a line-guide pivotally supported on said shift frame, means urging said guide away from said platen, and means acting in opposition to said urging means to maintain said guide in position to coöperate with said platen.

19. In a typewriting machine, the combination with a traveling carriage and a platen shiftable therein, of a scale shiftable with the platen, a key-operated shift-frame having ends and tie-rods, said scale pivoted in the ends of the frame, a supporting bail for said scale extending substantially straight to the ends, pivots at the ends for the bail, a segment above which lies the scale, resilient supports on the segment, adapted to hold the scale upon the platen, and a shift-rail for the platen connected to the frame to lift the platen and scale identical distances.

ALFRED G. F. KUROWSKI.

Witnesses:
   Catherine A. Newell,
   Ella A. Jolidon.